3,075,960
POLYMERIZATION PROCESS WITH A COMPLEX METAL HYDRIDE-ALUMINUM TRIALKYL-TITANIUM HALIDE CATALYST
John R. Lovett, Metuchen, and Joseph M. Kelley, Jr., Cranford, N.J., assignors to Esso Research and Engineering Company, a corporation of Delaware
No Drawing. Filed Oct. 29, 1958, Ser. No. 768,023
6 Claims. (Cl. 260—93.7)

This invention relates to an improved process for the low-pressure polymerization of olefins and more particularly to an improved polymerization process which results in an elevation in the melt index of the polymer products.

The low-pressure polymerization of alpha olefins with catalyst systems made up of reducible transition metal compounds and reducing metal containing compounds is well known to the art; see e.g. Belgian Patent 533,362, "Chemical and Engineering News," April 8, 1957, pages 12 through 16, and "Petroleum Refiner," December 1956, pages 191 to 196.

It is known for example that ethylene can be polymerized using a catalyst system consisting of a reducible transition metal compound reduced with a metal hydride of a group III metal, such as aluminum. These catalyst systems, however, do not produce polymers of controlled melt index.

It has now surprisingly been found that when a catalyst system containing at least three necessary components, namely (a) a reducible transition metal compound, (b) an organo-metallic compound, and (c) a mixed group I-group III metal hydride or aluminum hydride is used to polymerize alpha olefins, accurate control of polymer melt index and polymer molecular weight are obtained.

Reducible transition metal compounds which can be used as a catalyst component include inorganic compounds such as the halides, oxyhalides, complex halides, oxides, hydroxides, and organic compounds such as alcoholates, acetates, benzoates, and acetylacetonates of the transition metals of the IV, V, VI, VII and VIII periods of the periodic system, and iron and copper, e.g. titanium, zirconium, hafnium, thorium, uranium, vanadium, niobium, tantalum, chromium, molybdenum, tungsten, and manganese. The metal halides, particularly the chlorides, are generally preferred. Titanium and zirconium are the preferred metal components since they are the most active of these metals.

Preformed partially reduced transition metal compounds can also be used as the transition metal compound, and in fact are preferred in the present invention. These catalyst components are partially reduced heavy transition metal compounds or partially reduced heavy transition metal compounds cocrystallized with a group II or III metal compound such as halides, e.g. aluminum chloride, boron trichloride, zinc chloride, and the like. The partially reduced heavy transition metal compounds include inorganic compounds such as the halides, oxyhalides, complex halides, oxides and hydroxides, and organic compounds such as alcoholates, acetates, benzoates, and acetonates of the transition metals of the IV, V, VI, VII and VIII groups of the periodic system, and iron and copper e.g. titanium, zirconium, hafnium, thorium, uranium, vanadium, niobium, tantalum, chromium, molybdenum, tungsten and manganese. The metal halides, particularly the chlorides, are generally preferred; especially crystalline titanium trichloride. Crystalline titanium trichloride cocrystallized with aluminum chloride is even more preferred. When the catalyst is a partially reduced heavy transition metal compound cocrystallized with a group I or III metal compound, the catalyst contains from 0.05 to 1.0, preferably 0.1 to 0.5 mole of the group II or III metal compound per mole of partially reduced heavy transition metal compound. The partially reduced heavy transition metal compounds can be prepared by any procedure known to the art and the preparation of these compounds is not within the scope of the invention. However, some of the methods known for preparing the preferred preformed catalyst components, i.e. crystalline titanium trichloride and crystalline titanium trichloride cocrystallized with aluminum chloride are summarized below.

(1) Reduction of titanium tetrachloride with aluminum power in xylene at 100-175° C. at atmospheric pressure.
(2) Metal reduction of titanium tetrachloride with either aluminum powder, titanium powder, or mixtures of aluminum and titanium powder in the absence of solvent at elevated temperatures.
(3) Hydrogen reduction of titanium tetrachloride at temperatures above about 650° C.
(4) Reduction of titanium tetrachloride with metal alkyls, $AlEt_3$ in particular, in an inert diluent above about 100° C.
(5) Heating a mixture of titanium tetrachloride and an aluminum alkyl after the formation of a brown precipitate at a temperature above about 70° C. in the presence of an inert diluent.
(6) Reducing titanium tetrachloride with an aluminum trialkyl by carrying out the reduction in temperature graded stages in an inert diluent and with an aluminum trialkyl/$TiCl_4$ mole ratio of about 0.3/1.
(7) Heat reducing titanium tetrachloride at temperatures above about 1000° C.

Organo-metallic compounds suitable for use as a catalyst component of this catalyst system include the alkali and alkaline earth metal alkyl and/or aryl compounds; alkyl and aryl derivatives of other metals which have sufficient stability to permit reaction in their compound form with a reducible heavy metal compound, e.g. organo aluminum compounds such as triisobutyl aluminum, tripropyl aluminum, triethyl aluminum, dialkyl aluminum halides such as diethyl aluminum halides and dimethyl aluminum halides, and methyl and ethyl aluminum halides. Organo-aluminum compounds with two hydrocarbon radicals or at least one hydrocarbon radical and one hydrogen and containing an electron attracting group such as an alkoxy, halogen, and organic nitrogen can be used. Mixtures of the above organo-metallic compounds can also be used such as mixtures containing ethyl aluminum dichloride and triethyl aluminum. The organo-aluminum compounds, especially trialkyl aluminum and dialkyl aluminum halide are preferred. All of the above compounds and the methods for their preparation are well-known to the art.

The third component of the catalyst system is a mixed group I-group III metal hydride such as $LiAlH_4$, $NaAlH_4$, $NaBH_4$, and the like or $AlH_3$. Additionally, mixtures of two or more mixed metal hydrides can be used such as a mixture of $LiAlH_4$ and $NaAlH_4$. Also mixtures of $AlH_3$ and one or more mixed metal hydrides can be used. Henceforth, when the term "mixed metal hydride" is used, it is to be understood to mean one or more of the above compounds, i.e. one or more of $AlH_3$, $LiaAlH_4$, $NaAlH_4$, $NaBH_4$, and the like.

The catalyst system of the invention is prepared by first mixing the reducible transistion metal compound and the organo-metallic compound in an inert hydrocarbon diluent at a temperature of from about 20° to 135° C. and thereafter adding to the resulting mixture a dispersion of the mixed metal hydride in an inert hydrocarbon diluent. Alternatively, the dispersion of the mixed metal hydride can be added to the polymerization reactor together with or separately from the mixture of reducible transition metal compound and organo-metallic compound prior to the polymerization reaction. Also a portion of the mixed metal hydride can be added to the mixture of reducible transition metal compound and organo-metallic compound and a single or multiple increments thereafter added to the polymerization reactor during the polymerization reaction. The mixture of reducible transition metal compound and organo-metallic compound contains about 0.5 to 3.0 moles, preferably 1.0 to 2.0 moles of organo-metallic compound per mole of reducible transition metal compound. The total quantities of these two components are mixed together either with or without pretreatment, or a staged reduction pretreat technique can be used, i.e. by adding timed increments of the organo-metallic compound to the total quantity of reducible heavy transition metal compound. From 0.1 to 3.0 moles, preferably 1.5 to 2.5 moles of the mixed metal hydride is used per mole of the organo-metallic compound, depending on the effect of the specific hydride chosen on reaction rate and polymer molecular weight.

The inert diluents that are employed for forming the mixed metal hydride dispersion, for forming the mixture of reducible transition metal compound and organo-metallic compound, and for carrying out the polymerization reaction in the present process are aliphatic and aromatic hydrocarbons. Examples of useful aliphatic hydrocarbon diluents are n-hexane, n-heptane and n-decane. The aromatic hydrocarbons are the preferred diluents for use with the preformed catalysts, which are the preferred catalysts for the present process. Aromatic diluents such as benzene, toluene, and the xylenes can be used. The inert diluents used herein should be substantially free of catalyst poisons such as oxygen, carbon monoxide, sulfur and water. The diluent used to form the mixed metal hydride dispersion can be the same or different from the diluent used to prepare the catalyst which in turn can be the same or different from the diluent used in the polymerization reaction.

The alpha olefins polymerized by the novel catalysts of the invention are aliphatic alpha olefins having from 2 to 20 carbon atoms, and which can be either straight or branched chain, e.g. ethylene, propylene, butene-1, pentene-1, 3-methylbutene-1, and the like. $C_3$ to $C_4$ alpha olefins are preferred herein since they form crystalline plastics.

The polymerization reaction is carried out by contacting the olefins to be polymerized with the catalyst system of the invention in an inert hydrocarbon diluent at a temperature of from 40° to 125° C., preferably 70° to 115° C. and at pressures ranging from about 0 to 150 p.s.i.g., in batch or continuous operation. The polymer product concentration in the polymerization reaction mixtures is preferably kept between about 2 and 25 wt. percent based on the total contents present so as to provide for easy handling of the polymerized mixture. When the desired degree of polymerization has been obtained, a 1 to 3 stoichiometric equivalents of a chelating agent such as acetylacetone or diacetone alcohol per mole of total catalyst is added to the reaction mixture to dissolve and deactivate the catalyst. Thereafter a $C_1$ to $C_8$ alkanol such as methyl alcohol, isopropyl alcohol, or n-butyl alcohol is added to precipitate the polymer product from solution. Alternatively, the chelating agent and alkanol can be added together. The polymer product is then filtered and can be further washed with an alcohol or an acid such as hydrochloric acid and dried, compacted and packaged.

The polyolefins produced in accordance with the process of the invention have melt indexes of from 1 to 20 at 250° C.

The invention will be better understood from the following examples:

EXAMPLE I 0.46 g. of $TiCl_3 \cdot 0.33 AlCl_3$ was added from a dropping funnel to 100 cc. of xylene containing 4.68 cc. of a one molar solution of $AlEt_3$ in xylene. To this solution was added 0.0425 gram of $LiAlH_4$. The resulting mixture was then added to 900 cc. of xylene which had been presaturated with propylene gas at 65° C. The temperature of this mixture was then raised to 80° C. and the polymerization reaction carried out for one hour at this temperature. Thereafter 500 cc. of methanol containing 1.5 gm. of acetylacetone was added to chelate the catalyst and to precipitate the polymer product. The polymer product was then filtered, washed with methanol and dried. 104.1 gm. of polypropylene product were obtained. The details of the catalyst preparation in the polymerization reaction together with the properties of the polypropylene product obtained are given in Table I.

EXAMPLE II

The catalyst preparation and polymerization reaction were carried out according to Example I except that 0.25 gm. of $LiAlH_4$ were used. The details are given in Table I.

EXAMPLE III

The catalyst preparation and polymerization reaction are carried out according to the process of Example I except that no $LiAlH_4$ was added. The details of this run are given in Table I for comparison purposes.

*Table I*
BATCH ATMOSPHERIC PRESSURE POLYMERIZATIONS

|  | Ex. I | Ex. II | Ex. III |
| --- | --- | --- | --- |
| Catalyst: | | | |
| $TiCl_3 \cdot 0.33\ AlCl_3$, g | 0.46 | 0.46 | 0.46 |
| $AlEt_3$, cc. of 1 molar sol | 4.68 | 4.68 | 4.68 |
| $LiAlH_4$ | 0.0425 | 0.25 | 0 |
| Polymerization conditions: | | | |
| Propylene, l./min | 1.5 | 1.5 | 2.0 |
| Total reaction time, min | 60 | 60 | 60 |
| Catalyst, conc., g./l | 1 | 1 | 1 |
| Diluent | xylene | xylene | xylene |
| Temperature, °C. | 80 | 80 | 80 |
| Reaction rate, w./hr./w | 104.1 | 36.9 | 114.9 |
| Results: | | | |
| Amorphous polymer, percent | 6.2 | 6.6 | 4.7 |
| Insoluble polymer, g.— | | | |
| Weight, g | 97.7 | 34.5 | 109.6 |
| Melt index: | | | |
| @190° C | 0.10 | 0.9 | 0.11 |
| @250° C | 0.79 | 3.5 | 0.75 |
| Intrinsic Vis., Dl./g | 2.54 | 1.85 | 2.65 |
| Harris Molecular Wt. $\times 10^{-3}$ | 155 | 95 | 165 |
| Tensile strength, p.s.i | 5,060 | 5,585 | 4,600 |
| Elongation, percent | 40 | 40 | 50 |

It can be seen from the above table that a marked increase in the melt index of polypropylene was obtained using the catalyst system of the invention (Example II). This increase in melt index which is reflected also in molecular weight control renders the processing of poly alpha olefins very much easier, particularly with respect to the ease of extrusion which is important when the polymers of the invention are used in such applications as molded articles, e.g. bottles, pipes, hoses and the like. Additionally, it should be noted that the tensile strength of the polymer of Example II is about 1000 p.s.i. higher than the tensile strength of the polymer of Example III prepared in the absence of $LiAlH_4$. This increase in tensile strength is an additional advantage of the invention and it renders the polymer of the invention useful in applications where high tensile strengths are desirable, such as in plastic pipes.

The invention is not limited to the examples which are given for illustration purposes only. Also modifications of the process will occur to those skilled in the art without departing from the spirit and scope of the invention.

What is claimed is:

1. The process for the polymerization of an alpha olefin by a low pressure polymerization process comprising the steps of polymerizing an alpha olefin having from 2 to 5 carbon atoms in an inert hydrocarbon diluent with a catalyst system consisting essentially of (1) a halide of titanium cocrystallized with an aluminum halide, (2) from 0.5 to 3.0 moles of a trialkyl aluminum compound per mole of titanium halide, (3) about 1.5 to 2.5 moles of a group I and a group III mixed metal hydride per mole of trialkyl aluminum compound; and isolating the resulting alpha olefin polymers.

2. The process of claim 1 wherein catalyst component (3) is in the form of a dispersion.

3. The process of claim 1 wherein said titanium halide is crystalline $TiCl_3$ cocrystallized with aluminum chloride.

4. The process of claim 1 wherein component (3) is $LiAlH_4$.

5. The process of claim 1 wherein the alpha olefin is propylene

6. The process of claim 1 wherein component (1) is crystalline $TiCl_3$ cocrystallized with aluminum chloride, and component (2) is triethyl aluminum.

References Cited in the file of this patent

UNITED STATES PATENTS

| | | |
|---|---|---|
| 2,827,447 | Nowlin et al. | Mar. 18, 1958 |
| 2,846,427 | Findlay | Aug. 5, 1958 |
| 2,886,561 | Reynolds et al. | May 12, 1959 |
| 2,914,515 | Stuart | Nov. 24, 1959 |
| 3,010,787 | Tornqvist | Nov. 28, 1961 |

FOREIGN PATENTS

| | | |
|---|---|---|
| 543,913 | Belgium | June 23, 1956 |

OTHER REFERENCES

Ruff et al.: "Zeitschrift für anorganische Chemie," February 23, 1923, vol. 128, pp. 81–95, page 84 only needed.